Figure 1:
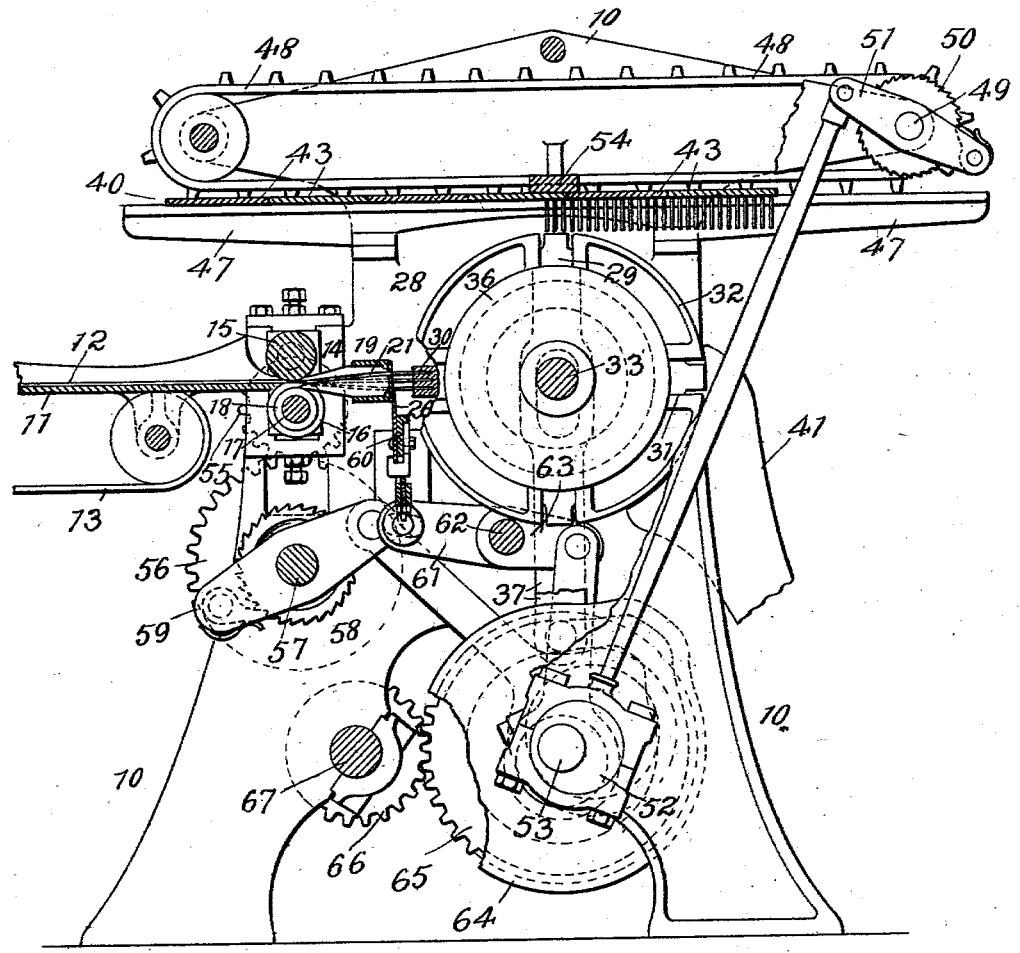

No. 716,815. Patented Dec. 23, 1902.
J. A. E. CRISWELL.
MACHINE FOR MAKING MATCHES.
(Application filed Apr. 6, 1901.)

(No Model.) 5 Sheets—Sheet 1.

WITNESSES: INVENTOR

No. 716,815. Patented Dec. 23, 1902.
J. A. E. CRISWELL.
MACHINE FOR MAKING MATCHES.
(Application filed Apr. 6, 1901.)
(No Model.) 5 Sheets—Sheet 2.
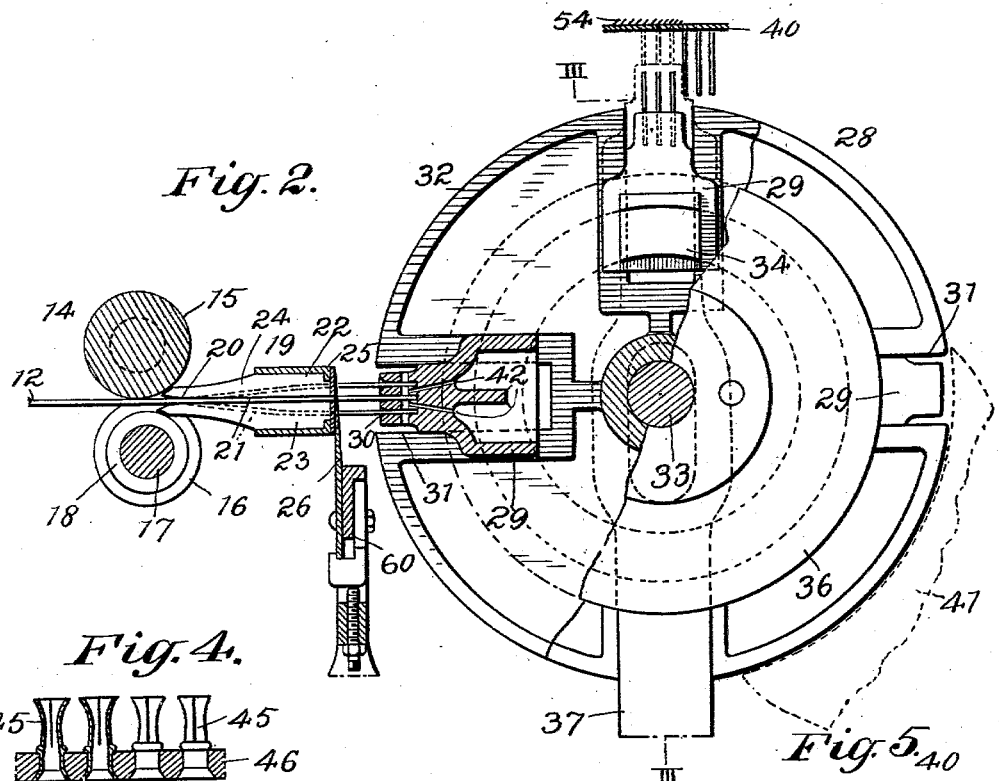
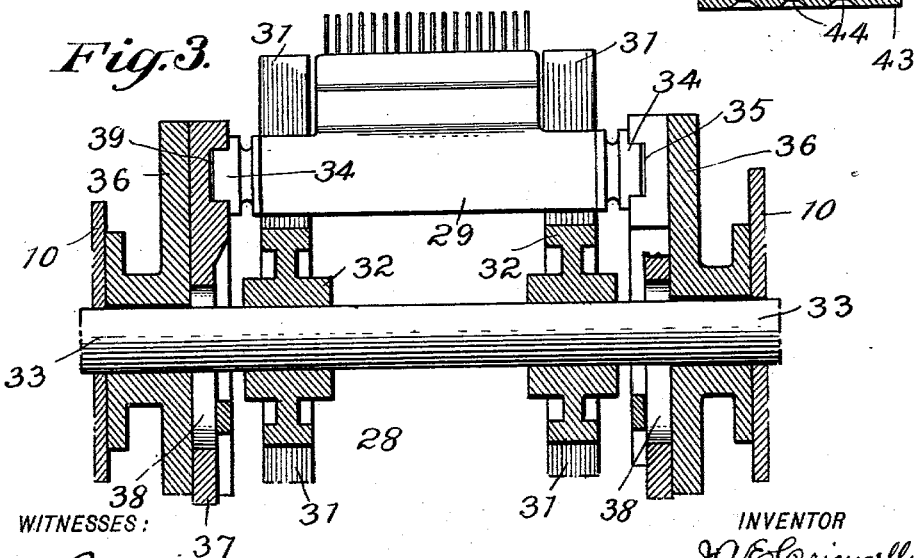
WITNESSES: INVENTOR
W. R. Davis J. A. E. Criswell
William Foster
THE NORRIS PETERS CO., PHOTO-LITHO., WASHINGTON, D. C.

No. 716,815. Patented Dec. 23, 1902.
J. A. E. CRISWELL.
MACHINE FOR MAKING MATCHES.
(Application filed Apr. 6, 1901.)
(No Model.) 5 Sheets—Sheet 3.
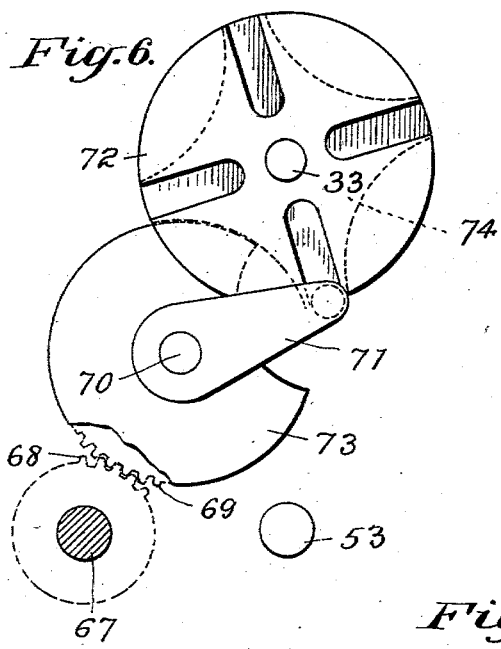
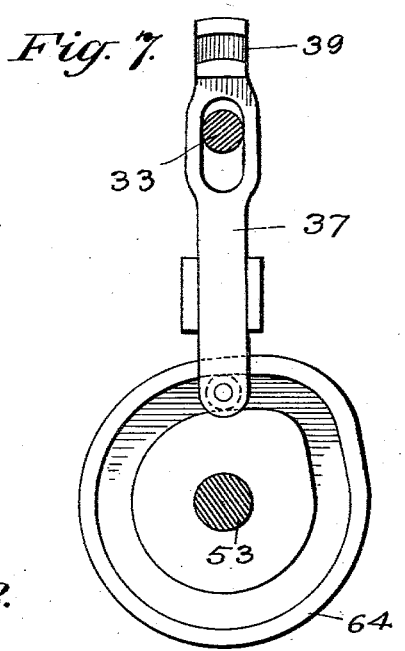
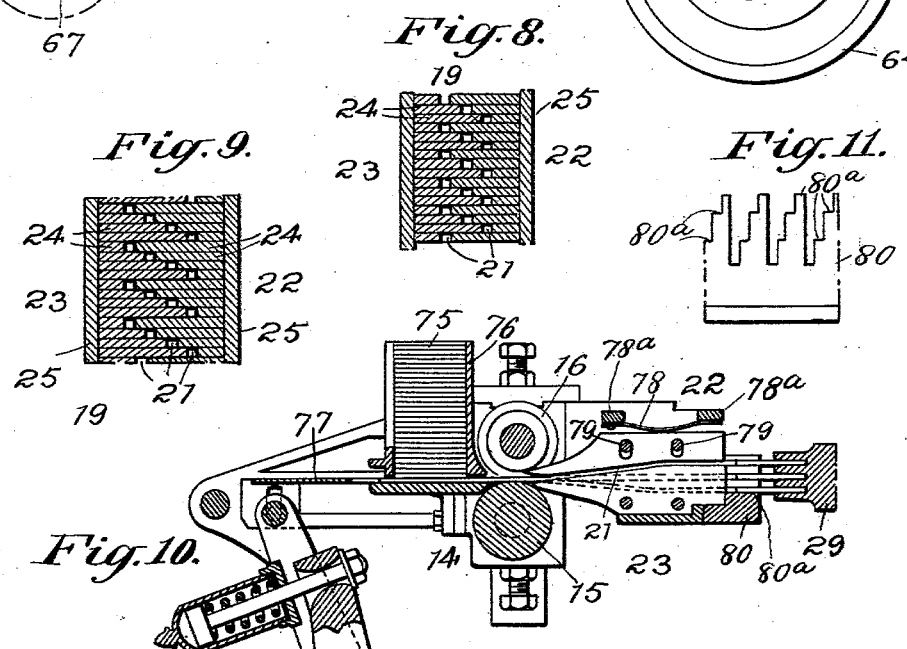
WITNESSES:
INVENTOR No. 716,815. Patented Dec. 23, 1902.
J. A. E. CRISWELL.
MACHINE FOR MAKING MATCHES.
(Application filed Apr. 6, 1901.)
(No Model.) 5 Sheets—Sheet 4.
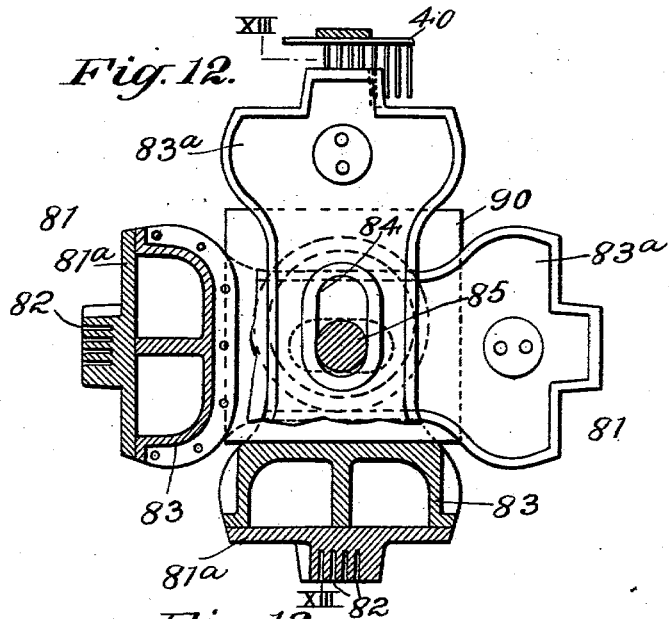
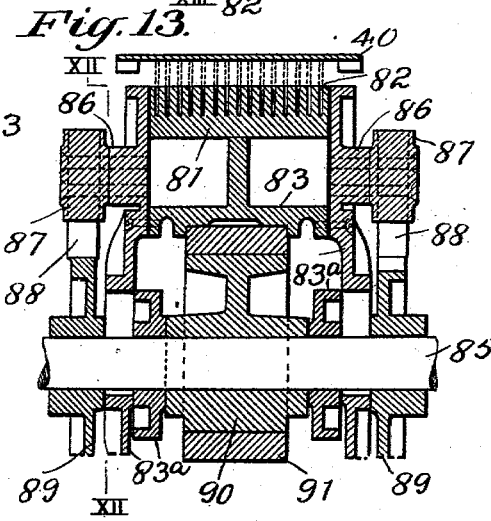
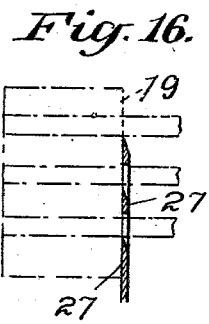
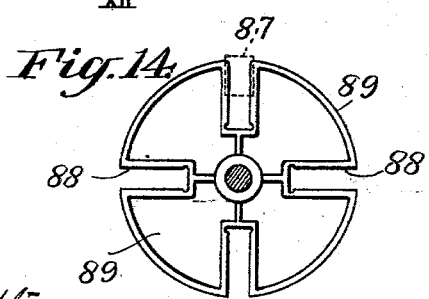
WITNESSES: INVENTOR No. 716,815. Patented Dec. 23, 1902.
J. A. E. CRISWELL.
MACHINE FOR MAKING MATCHES.
(Application filed Apr. 6, 1901.)
(No Model.) 5 Sheets—Sheet 5.
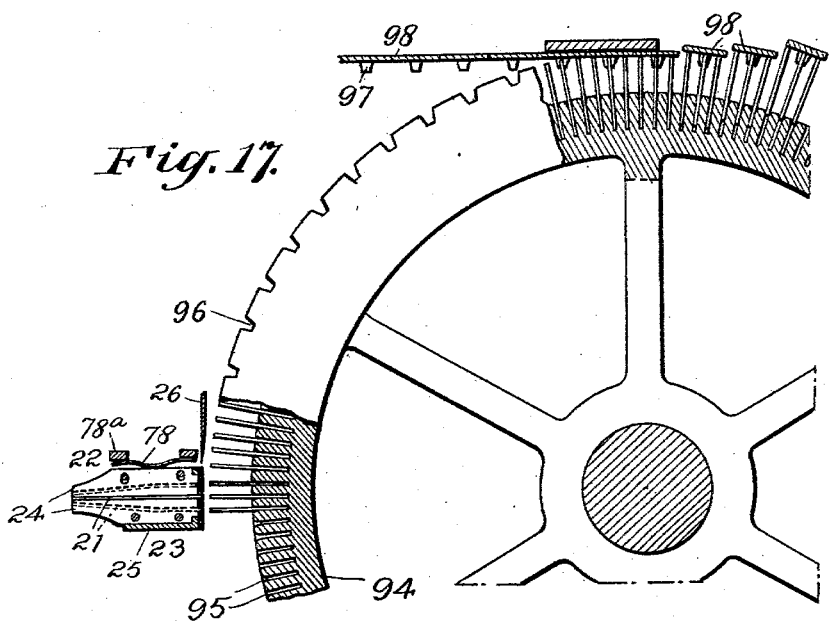
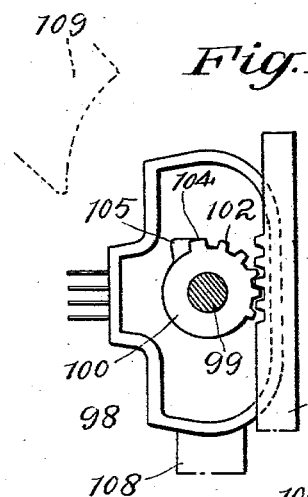
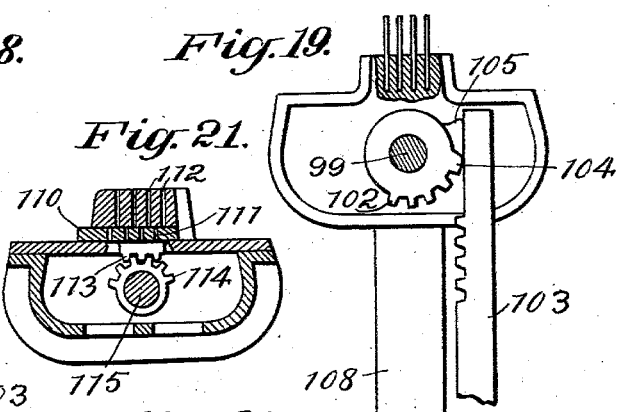
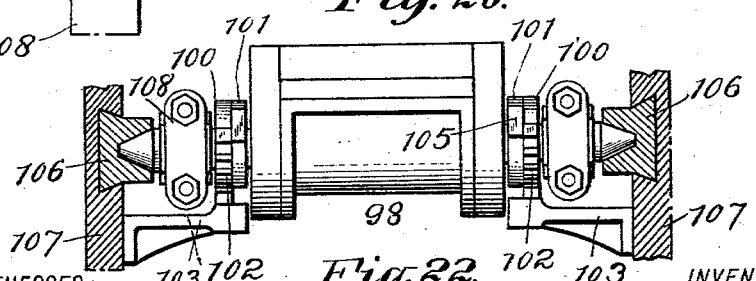
WITNESSES: INVENTOR

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,815, dated December 23, 1902.

Application filed April 6, 1901. Serial No. 54,618. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to such as is disclosed in my Patent No. 656,014, dated August 14, 1900.

The primary object of the invention is to provide simple and efficient means by which splints may be cut from strips, cards, or blanks of veneer, separated into independent rows, then holding and carrying such rows by an independent transfer-carrier, and finally forcibly inserting or sticking such separated rows by the transfer-carrier into a second carrier for holding the splints to complete the matches, thus avoiding, among other objections, the necessity for providing a large number of splint-holding sections of the second carrier with independently-movable clamping devices, such as are ordinarily employed in many machines of this character.

A further object of the invention is to provide simple and efficient means by which previously-cut splints are separated into a series of more than two independent rows and such separated rows forcibly inserted into a suitable carrier for holding the splints while completing the matches.

The invention will be hereinafter more particularly described with reference to the accompanying drawings, which form a part of this specification, and then pointed out in the claims at the end of the description.

In the drawings, Figure 1 is a vertical longitudinal section, partly in elevation, of one form of machine embodying my invention. Fig. 2 is an enlarged fragmentary section, partly in elevation, of the separator, cutting means, and transfer-carrier. Fig. 3 is a vertical transverse section taken on the line III III of Fig. 2. Figs. 4 and 5 are fragmentary sections of different forms of carrier or holding devices for the splints. Fig. 6 shows in elevation one form of mechanism for operating the transfer-carrier. Fig. 7 shows one form of means for operating the transfer-carrier bars. Fig. 8 is a fragmentary transverse section of the separator, showing the position of the channels to divide the splints into three independent rows. Fig. 9 is a view similar to Fig. 8, except that the channels are arranged to divide the splints into four independent rows. Fig. 10 is a vertical section of a machine in which splint-cards are cut into splints, separated, and discharged into the transfer-carrier. Fig. 11 is a fragmentary view of a supplementary splint supporting and guiding bar or plate. Fig. 12 is a vertical section, partly in elevation, of another form of transfer carrier or device, taken on the line XII XII of Fig. 13. Fig. 13 is a vertical fragmentary section taken on the line XIII XIII of Fig. 12. Fig. 14 is a view, on a smaller scale, of one of the wheels or disks for operating the separator-sections. Fig. 15 is a section of another cutting device for cutting the material into splints. Fig. 16 is another form of cutting device for cutting the splints transversely to form complete splints. Fig. 17 is a fragmentary section, partly in elevation, of another means for transferring the splints. Figs. 18, 19, and 20 show still another transfer-carrier for the splints, and Figs. 21 and 22 show different means for permitting the holding devices to be cleaned of fiber and the like.

The frame 10 may be of any suitable construction, and projecting outward therefrom is a hopper 11, in which long strips or blanks of veneer 12 are placed and initially fed inward by a traveling belt 13 or otherwise. The veneer strips as they are fed or forced inward are cut into long splints by the cutting device 14. This cutting device is the same as in my patent already referred to, though it is to be understood that any suitable cutting means may be employed. As shown, there is a metallic roll 15 and a series of circular cutters 16 held to the spindle or shaft 17. The cutters are spaced apart by the washers 18 the width of the splints and cut the splints in a close row. The splints as they are cut pass into a suitable separator 19. This separator has a single pass 20, that diverges into a series of independent rows of independent channels 21. The channels and single pass are formed by opposed members 22 and 23 of the plates 24, the whole being held in a suitable box or casing 25. The channels may be in three independent rows, as in Figs. 1, 2, and 8, or they may be arranged in four rows, as in Fig. 9, and working across the face of the separator is a reciprocating knife or cutting device 26, which cuts the long splints transversely to form complete splints. A knife-bar having a single cutting-surface may be employed to cut the splints, or a knife-bar having a series of knives 27, as in Fig. 16, might be employed. The parts thus far described are substantially the same as in my Patent No. 656,014.

Instead of the separated splints being discharged direct into the holding means or holding-carrier the splints are discharged into a transfer device or carrier and then forcibly inserted into the second or holding carrier. For this purpose various means may be employed. As shown, the transfer-carrier 28 has four independent sections 29, though there may be any desired number. The sections or slides 29 have holding devices 30 arranged in rows and corresponding in position to the channels in the separator, the holding devices being adapted to receive the ends of the splints before they are cut transversely by the device 26, so as to prevent all possibility of losing control over them. The sections 29 are held to slide radially in the slots 31 of the rotary wheels 32. These wheels 32 are fixed to the shaft 33 and impart motion to the sections when the shaft is rotated. The ends 34 of the sections project beyond the wheels and normally travel in annular grooves 35 in the stationary disks or flanges 36. The flanges or disks 36 are secured to the frame 10 and have vertical slots therethrough, in which the bars 37 are held to slide. The bars 37 are provided with slots 38, so as to span the shaft 33, and are each provided with a groove or slot 39, which normally registers with the annular groove 35 of its disk 36. The sections receive the splints from the separator as they are successively presented opposite thereto, and as the splints pass into the holding devices 30 of the sections and are cut off by the knife 26 they are pushed by the latter slightly farther into the holding devices. An intermittent movement of one-quarter of a revolution is now given the shaft 33, which causes the wheels 32 to impart a like movement to the sections 29. This will place the section filled with splints in a vertical position, and the ends 34 of the sections will rest in the grooves 39 of the bars 37. A quick vertical movement is now given the bars by means hereinafter described, which will force the section upward, so as to stick the splints into the holding means or carrier 40, and will then return the section to its former position, leaving the splints in the holding-carrier, the slots 31 in the wheels permitting this movement and also helping to guide the sections during the sticking operation. As the wheels 32 are again rotated the ends 34 of the section or slide just acted on will pass into the annular grooves 35 of the disks 36. This operation will be repeated as the sections are successively presented to receive and to discharge the splints, and as the wheels continue to rotate the sections will move in the path of a suction or other device, as at 41. The device 41 is in the form of a chute and is connected to an exhaust-fan and serves to remove broken splints, fiber, dust, and the like from the separator-sections, the holding devices 30 of the sections having communication with the passages 42 to permit the suction to act properly through the holding devices. By this means the splints are carried away from and clear of the separator and are forcibly inserted into the holding devices of the holding-carrier.

The holding-carrier 40 may be of any suitable form or construction and may consist of the plates 43, having the holes 44, as in Fig. 5, for compressing and holding the ends of the splints, as is usual with so-called "round" splints, or the holding devices may consist of metallic bushings 45, carried by the plate 46, this construction being substantially the same as in my patent previously referred to. The holding-carrier may consist of a series of independent plates or sections, as shown, or the sections may be held together in the usual or in any preferred manner for paraffining and heading to complete the matches. As shown, the independent plates or sections slide along brackets 47 and may be held to register with the transfer-carrier sections and be forced along the brackets 47 by endless chains 48. These chains have teeth to enter recesses in the plates and travel around suitable pulleys journaled on the frame 10. The shaft 49 has a ratchet-wheel 50, the teeth of which are engaged by a pawl carried by the arm 51, and this arm is connected to a rod that is operated by an eccentric 52 on the shaft 53. As the shaft 53 is operated the carrier-plates will be given a step-by-step movement to receive the splints, a plate 54 or other means being provided to take the thrust while the splints are being forced into the carrier-plates.

Any suitable timing and operating mechanism may be used for the several movable parts. A gear 55 is secured to the spindle 17 of the cutting device, and this gear meshes with a gear 56 on the shaft 57. On this latter shaft is a ratchet-and-pawl-operating device 58, the arm 59 of which is operated by an eccentric on the shaft 53, so as to impart an intermittent movement to the cutting device sufficient at each rotation of the shaft 53 to cut the material the length of the complete splints. The knife 26 for cutting the splints transversely is adjustably and removably held to a head 60, and this head is suitably guided in the frame. The head 60 is operated by levers 61, which rock or oscillate with the shaft 62. This latter shaft has an arm 63, to which is connected the strap of an eccentric on the shaft 53 and by which the knife 26 is given a reciprocating motion. The bars 37 of the transfer-carrier are operated by the cams 64, Figs.

1 and 7, secured to the shaft 53, the said bars having rolls which work in grooves in the cams. This shaft 53 has a gear 65, which is in mesh with a smaller gear 66 on the main driving-shaft 67, the latter being provided with a suitable belt-pulley. The transfer-carrier may be operated from the main driving-shaft by the usual form of Geneva movement. A gear 68, Fig. 6, on the shaft 67 meshes with a gear 69 on a stud or shaft 70. On the shaft 70 and rotating with the gear 69 is an arm 71, that carries a stud or roll which enters radial slots in the disk 72 on the transfer-shaft 33. A locking-disk 73, rotating with the arm 71, engages the periphery of the substantially rectangular disk 74 and locks the shaft 33 during the receiving and discharging of the splints.

The invention so far described will be readily understood from the foregoing description when taken in connection with the accompanying drawings.

The sheets or strips of veneer being fed to the cutting device 14, the latter as it is operated will cut the material into long splints, and as the splints are cut they will enter the channels 21 of the separator and will be divided into independent parallel rows. As the splints pass out of the channels 21 they will enter the holding devices 30 of the section 29 of the carrier 28 which is opposed to the channels. The knife 26 will now be operated by the mechanism already described and will cut the long splints into complete splints. A quarter of a turn is now given the shaft 33, which will cause the sections 29 to be also moved a like distance, and as the ends 34 of the sections ride in the annular grooves 35 the ends of the one filled with splints will enter the grooves 39 of the bars 37. These bars will now be operated and will force the section upward to stick the splints into the holding-carrier 40, as already described and as shown in dotted lines in Fig. 2, the section being returned, leaving the splints in the carrier. At this time splints may be received by the section opposite the separator, so that the transfer-carrier will receive and discharge splints at the same time. This operation will be repeated until one or more of the holding means or carrier-sections are filled with splints, when they may be taken away and the matches completed by hand, or if the plates are held or linked together the matches may be completed automatically in the usual or in any preferred manner.

In Figs. 10 and 11 means is shown by which cards the length of the splints may be cut and separated and then forced into the holding means. The cutting device and manner of feeding the cards to the cutting device are identical with that shown in my patent hereinbefore mentioned, and the cutting device and the separator, with one or two exceptions, are substantially the same as already described. The cards 75 are forced from the hopper 76 by a plunger 77 and are cut into splints by the cutting device 14. The plunger is slotted at its end to pass by the knives and aline the splints in the separator after the cutters cease to act upon the splints, and the plunger has a yielding connection with the operating mechanism to yield during the cutting of the splints, as fully described in my patent. The members 22 and 23 are yieldingly held together either as a whole or the plates may be independently held to yield, so as to provide channels having yielding walls to permit anything that would tend to clog the channels being forced therethrough and to permit the channels to compensate for varying thicknesses of splints. In the form shown the plates of the member 23 are non-yielding and those of the member 22 are forced downward by springs 78, which are suitably held to cross-bars 78$^a$. The plates are slotted and are adapted to have a limited vertical movement on the rods 79, these latter passing through all the plates of the member 22 and serving to assist in guiding the plates should they have to yield by the thickness of the material passing therethrough. A bar 80 is secured to the separator or to the frame, and this bar or plate is provided with fingers 80$^a$, forming supports and guiding-surfaces for the splints, as best shown in Fig. 11. This guide and supporting-bar 80 may be used in connection with long splints; but in that case the cutting means for cutting the splints transversely will work from above, or the bar will be a sufficient distance from the separator to permit the cutting means to work properly. The splints are discharged into the carrier-section 29 and forced into the holding means, as previously described. The yielding plates or members of the separator may be used with any of the other constructions.

In my pending applications, Serial No. 40,001, filed December 15, 1900, and Serial No. 41,818, filed January 2, 1901, a rotary separator and rotary or movable means by which the splints are carried bodily and forced into a dipping-carrier is claimed broadly, while in this application the feature of a separator independent of the cutting means or the transfer-carrier and means delivering separated splints into one or more independent sections or devices endwise and these devices moved by reciprocatory or other means to force the splints into the dipping-carrier is broadly claimed herein, together with the particular form of means for separating the splints and for delivering the separated splints to the sections or devices.

The transfer-carrier shown in Figs. 12 to 14 has also four independent sections, and the splints may be fed thereto as already described or in any suitable manner. The sections 81 each comprise a plate 81$^a$, in which are the holding devices 82, and the plates 81 are secured to brackets 83. The brackets are securely held to the arms 83$^a$. These arms are arranged in pairs or sets, one pair being arranged at right angles to the other. The arms are each provided with a slot 84, so as to span the shaft 85 and to permit the arms to be reciprocated or moved radially, and each pair of arms carries two of the sections 81. The arms 83ª have bosses 86, to which are secured the boxes or slides 87, that are slidingly held in radial slots 88 in the wheels or disks 89. The wheels 89 are loose on the shaft 85, and as they rotate they will also rotate the arms 83ª and the sections carried thereby. An eccentric 90 is secured to the shaft 85 and is surrounded by a block 91. This block is rectangular and provides a straight bearing-surface for each section, and as the eccentric is rotated it forces the sections radially.

Any suitable mechanism may be used to operate the shaft and the carrier-sections. The sections are successively brought in position to receive the splints, which may be fed to the sections as previously described. After the section opposed to the separator receives the splints the wheels 89 will be given one-quarter of a revolution, which will place the section filled with splints under the holding-carrier 40. The shaft 85 is now given a complete revolution, which will force the block and the arms so as to stick the splints into the carrier 40 and will return the section away clear of the splints, leaving the latter in the holding-carrier. All the sections will be reciprocated during the rotary movement of the shaft 85, and the section opposite the separator will be moved toward the latter to receive the incoming splints. The shaft 85, as will be seen, is given one complete revolution at each one-quarter of a revolution of the wheels 89, and these movements may be entirely independent of each other, or the intermittent one-quarter revolution of the wheels may be so timed that it will take place at the same time as and with the last one-quarter revolution of the shaft and eccentric. The position of the parts as shown in Figs. 12 and 13 is just as the shaft has made one-half of its independent movement and as the arms and section have been moved to force the splints into the holding-carrier. The sections as they rotate may be subjected to cleaning means, as already described.

Fig. 15 shows a cutting device in which there are two parallel spindles 92, each of which is provided with cutters 93, spaced apart. The cutters are beveled on one side only, and those of one spindle are made to overlap those of the other in the usual manner.

Fig. 17 shows a rotary drum or transfer-carrier 94, having the holding devices 95. This drum is also provided with recesses 96, which register and mesh with the teeth 97 of the holding-carrier plates or sections 98 and cause or assist in causing the holes in the plates to register with holding devices 95 of the drum. The plates are pivotally held in a frame or otherwise and move tangential to and in the same direction as the drum. As the drum and carrier are given a step-by-step movement the splints will be forced by the drum into the holes of the holding-carrier, and as the latter carrier continues to move the splints will be gradually withdrawn from the holding devices 95, the plates tilting sufficiently to permit the withdrawal of the splints without making them loose.

The form of transfer device in combination with certain features shown in Fig. 17 is claimed in my application, Serial No. 41,818, filed January 2, 1901, and rotary means of the character shown, in which the splints are separated as well as carried, is claimed, broadly, in my pending application, Serial No. 40,001, filed December 15, 1900.

The transfer-carrier 98 (shown in Figs. 18 to 20) consists of a single section. This section is substantially the same as one of the sections of Figs. 12 and 13, and the section is held to a shaft 99. On the shaft and held to the section on each side thereof are two disks 100 and 101. The disks 100 have teeth 102 adapted to mesh with the teeth of the stationary racks 103 and by which the sections are given a rotary movement as they are forced along the racks 103, as will be presently described. The disks 100 have a false or larger tooth 104, and the disks 101 have a foot 105. The shaft 99 has its ends rotatably supported in the slides 106, that work in suitable guides in the frame 107, to which the racks 103 are also secured. Rods 108 are connected to the shaft 99, and as said rods are reciprocated the section will also be forced along the racks 103. The section or carrier will be rotated one-quarter of a turn by the teeth 102 meshing with the teeth of the racks and until the foot 105 of each disk 101 rests upon the straight portion of the racks 103. This will guide and hold the section in this position and until the splints previously fed thereto are forced into the holding-carrier, as shown in Fig. 19. On the return stroke the tooth 104 of the disks 100 will strike the teeth of the racks and will cause the teeth 102 to again mesh therewith and rotate the section to its former position to again receive splints. During the return stroke of the section the latter may be subjected to a suction or blast of air to clean the holding devices of any dust or fiber that might remain therein. A pipe 109 is shown in dotted lines for this purpose in Fig. 18, which may be connected to an exhaust-fan, and in this case the suction should be controlled so as to act upon the section only during the return stroke.

The form of transfer device just described is claimed specifically in my pending application, Serial No. 55,610, filed April 13, 1901, and a separator as distinguished from a transfer device is claimed in my pending application, Serial No. 55,448, filed April 12, 1901.

Any or all of the transfer-carrier sections may have passages to permit the suction to act properly to remove dust, fiber, and the like from the holding devices thereof. Either in conjunction with or instead of the suction device or air-passages a movable plate 110 may be provided, as in Fig. 21. In this case the plate has holes 111 to register with the holding devices 112, and while receiving the splints the holes and holding devices register. As the section is moved the plate 110 is shifted to alter the relative position of the holes and holding devices, and the plate will then form an abutment for the ends of the splints during the sticking operation, while when the holes register with the holding devices any material, as chips, fiber and the like therein, will be forced out of the holding devices by the incoming splints. As one means for operating the plate the latter may have inward-projecting racks 113, which mesh with gears 114 on the shaft 115, and this shaft might be operated by any suitable means or by a movement substantially as shown in Figs. 18 to 20 for rotating the section.

In Fig. 22 instead of the movable plate 110 the holding devices 116 might terminate in an open space 117 to permit any fiber and the like to pass out of the holding devices. In this case the surface 118 will form an abutment for the splints while being forced into the carrier.

It will be seen from the foregoing that simple and efficient means is provided whereby the splints after being separated are carried away from the separator and then positively forced into the holding-carrier, thus avoiding the necessity for having the latter provided with movable clamping devices.

It will be understood that the holding-carrier might be fed through the machine in any desired manner and that suitable locking and alining means might be employed to positively hold said holding-carrier while receiving the splints from the transfer-carrier.

It will be further understood that the splints may be supplied to the transfer carrier or sections in any suitable manner and from any suitable source of supply. The jaws of the transfer device may be yielding or springs may be used to hold the splints, and where the splints are forced into the carrier they may be ejected automatically in the usual or in any preferred way.

By the term "veneer" it will be understood that wood veneer or any material from which splints may be cut is included, and while means for cutting square splints only is shown the form of the splints will vary according to the means employed for producing them.

Having thus described my invention, what I claim as new, and desire to secure by Letters Patent, is—

1. In match-making machinery, the combination with splint-cutting means, of a separator dividing the splints into a series of independent rows, a carrier receiving the independent rows of splints from the separator, and a second dipping-carrier receiving the splints endwise from the first-mentioned carrier.

2. In match-making machinery, the combination with splint-cutting means, of a separator dividing the splints into a series of more than two independent rows, a carrier receiving the independent rows of splints and carrying them away from and clear of the separator, and a second dipping-carrier receiving the splints endwise direct from the first-mentioned carrier.

3. In a match-making machine, the combination with splint-cutting means, of a series of movable splint-carrying devices adapted to hold splints separated and in rows, separating means for the splints delivering the latter separated into the devices, holding means for the splints, together with means for successively forcing the device to carry and stick the splints in the holding means.

4. In a match-making machine, the combination with splint-cutting means, of a series of intermittently circularly moving splint-carrying devices adapted to hold splints endwise, means independent of the devices for separating the splints into a series of more than two independent rows and delivering the splints into the devices, a carrier, and means for positively forcing the successive devices to stick the separated splints in the carrier.

5. In a machine for making matches, the combination with splint-cutting means, of a series of intermittently-movable and independent sections or devices adapted to hold splints separated, means independent of the cutting means for delivering separated splints endwise into the sections or devices, and dipping or holding means receiving the separated splints from the independent sections.

6. In a match-making machine, the combination with splint-cutting means, of a series of more than two separate and independent sections each receiving the splints endwise in succession and holding them separated and in independent rows, means for delivering separated splints into the sections, a dipping-carrier, and means for successively moving the sections in a different plane from that of its former movement toward the carrier to place the splints in said carrier.

7. In match-making machinery, the combination with a series of more than two separate movable and non-splint-separating sections or devices, of means delivering properly-separated splints endwise to the devices, the sections being adapted to hold the splints separated and in independent rows, a dipping-carrier, and means for successively reciprocating the sections in a different plane and direction from their former movement and toward the carrier to place the splints in said carrier.

8. In match-making machinery, the combination with a series of independent circularly-moving sections each having means for holding splints, of means for delivering properly-separated splints endwise to the sections, means for revolving the sections in unison, a dipping-carrier, and means for successively moving the sections out of the circle of motion to place the splints in the carrier.

9. In match-making machinery, the combination with a series of independent devices receiving the splints endwise and holding them separated in rows, means for delivering the separated splints endwise to the devices, wheels for revolving the devices, means for successively moving the sections radially in the wheels, and dipping means for the splints.

10. In match-making machinery, the combination with splint-cutting means, of a device receiving the splints endwise, means for delivering separated splints to the device, wheels for revolving the device and having a sliding connection with said device, a dipping-carrier, and means for moving the splint-carrying device radially in the wheels to place the splints in the dipping-carrier.

11. In match-making machinery, the combination with a series of independent sections or devices, means for delivering separated splints endwise to the devices, a dipping-carrier, and means for forcing one section or device toward the source of supply to receive splints and at the same time force another device toward the carrier to force the splints into said carrier.

12. In a match-making machine, the combination with splint-cutting means, of an intermittently-movable carrier having radial arms each provided with means receiving the splints in succession, means for delivering separated splints endwise to the splint-receiving means of the carrier, dipping means for the splints, and means for reciprocating the arms to force the splints to the dipping means.

13. In a match-making machine, the combination with a carrier having diametrically-opposed arms, each provided with holding devices for the splints and receiving the latter in rows endwise in succession, of means for delivering separated splints to the holding devices of the arms, a second or dipping carrier, and means for reciprocating the arms to force the splints into the second carrier.

14. In match-making machinery, the combination with a movable and reciprocatory device, of means independent of the reciprocatory device for delivering separated splints endwise ready for dipping to said device, a dipping-carrier, together with means for reciprocating the device to force the splints into the carrier.

15. In a match-making machine, the combination with splint-cutting means, of a separator dividing the splints into a series of independent rows, a carrier receiving the independent rows of splints and carrying them away from and clear of the separator, and a second carrier into which they are forcibly inserted by the first-mentioned carrier.

16. In a match-making machine, the combination with splint-cutting means, of a separator dividing the splints into a series of independent rows, an intermittently-movable carrier comprising a series of independent sections each receiving in succession the rows of splints and carrying them away from the separator, and holding means receiving the splints from the intermittently-movable carrier.

17. In a match-making machine, the combination with splint-cutting means, of a separator dividing the splints into a series of independent rows, an intermittently-movable carrier, comprising a series of four independent sections each receiving in succession a series of independent rows of splints and carrying them bodily at once away from and clear of the separator, a carrier, and means for positively forcing the successive sections radially to stick the splints into the carrier.

18. In a match-making machine, the combination with splint-cutting means of a separator dividing the splints into a series of independent rows, of a carrier having a series of independent circularly-moving sections each receiving in succession the independent rows of separated splints, holding means for the splints, and means for moving the sections out of their circle of rotation to forcibly insert the splints into the holding means.

19. In a match-making machine, the combination with splint-cutting means, of a separator dividing the splints into a series of independent rows, a carrier having a series of circularly-moving independent sections each receiving the splints in independent rows, a carrier, and means for moving the sections in succession toward the carrier to place the separated splints therein.

20. In a match-making machine, the combination with splint-cutting means, of a separator dividing the splints into independent rows, a movable carrier having a series of independent sections each receiving the splints endwise in succession and carrying them away from the separator, a second carrier, and means for moving the sections independent of the carrier as a whole to place the splints in the second carrier.

21. In a match-making machine, the combination with splint-cutting means, of a separator dividing the splints into a series of independent rows, a series of movable independent sections each having holding devices for the splints and holding the latter endwise and separated into independent rows, a carrier, and means for successively reciprocating the sections to forcibly stick the splints in the carrier.

22. In a match-making machine, the combination with splint-cutting means, of a separator dividing the splints into a series of more than two independent rows, a series of movable independent sections each having holding devices for the splints receiving the latter endwise direct from the separator, and means for successively reciprocating the sections to forcibly stick the splints in the carrier.

23. In a match-making machine, the combination with splint-cutting means, of a separator dividing the splints into a series of independent rows, holding means for the splints, and a revoluble and reciprocatory section receiving the splints endwise direct from the separator and forcibly inserting the rows of splints into the holding means.

24. In a match-making machine, the combination with splint-cutting means, of a separator dividing the splints into a series of more than two independent rows, holding means for the splints, and a revoluble and reciprocatory section receiving the splints endwise direct from the separator and forcibly inserting the rows of splints into the holding means.

25. In a match-making machine, the combination with splint-cutting means, of a separator dividing the splints into a series of independent rows, a carrier, and a movable and reciprocating section receiving the splints endwise and forcibly inserting them into the carrier.

26. In a match-making machine, the combination with splint-cutting means, of a separator dividing the splints into a series of more than two independent rows, a carrier, and a movable and reciprocating section receiving the splints endwise in independent rows direct from the separator and carrying them bodily at once and forcibly sticking them into said carrier.

27. In a match-making machine, the combination with splint-cutting means and means for feeding veneer to the cutting means, of a separator dividing the splints into independent parallel rows, an intermittently-movable carrier comprising a series of independent sections receiving in succession the independent rows of splints endwise direct from the separator, a second carrier, and means for successively reciprocating the sections toward and from the carrier to forcibly insert and leave the splints in said carrier.

28. In a match-making machine, the combination with means for supplying properly-separated splints endwise and in rows, of a series of circularly-moving independent sections each receiving and holding the splints endwise, means for moving the sections in unison, a carrier, and means for successively moving the sections out of the circle of motion to place the separated splints in the carrier.

29. In a match-making machine, the combination with splint-cutting means, of a separator having a single way pass or opening in the plane of the material and diverging into more than two independent rows of independent channels provided with yielding walls which permit different sizes of splints to readily pass therethrough, and holding means for the splints.

30. In a match-making machine, the combination with splint-cutting means, of a stationary separator receiving the splints endwise and having independent rows of independent channels provided with yielding walls which normally rest against each splint yet permit different sizes of splints to readily pass therethrough, and holding means for the splints.

31. In a match-making machine, the combination with splint-cutting means, of a stationary separator receiving the splints endwise and having independent channels formed by two opposed sections one of which provides yielding walls for the splints, and holding means for the splints.

32. In a match-making machine, the combination with means for supplying splints, of a separator receiving the splints endwise and comprising members yieldingly held together which separate the splints into independent rows, and holding means for the splints, for the purpose set forth.

33. In a match-making machine, a separator provided with a single way, pass or opening in the plane of the material and diverging into independent rows of channels provided with yielding walls each channel forming a continuation of said single way or pass.

34. In a match-making machine, the combination with means for supplying splints, of a separator receiving the splints endwise and comprising members yieldingly held together which separate the splints into more than two independent parallel rows, and holding means for the splints.

35. In a match-making machine, the combination with splint-cutting means, of a separator provided with a single way, pass or opening in the plane of the material and diverging into independent rows of independent channels, each channel forming a continuation of said single way or pass, holding means for the splints, and a movable and reciprocating section carrying the splints away from the separator during one movement and forcibly inserting the splints into said carrier during the reciprocatory movement.

36. In a match-making machine, the combination with a splint-cutting device provided with a series of knives or cutters spaced apart, of a separator receiving the splints endwise direct from the cutting means and dividing them into more than two independent rows, and a movable and reciprocating section receiving the splints endwise and forcibly inserting them into the carrier.

37. In a match-making machine, the combination with splint-cutting means, of a separator provided with a single way, pass or opening in the plane of the material and diverging into independent rows of independent channels, each channel forming a continuation of said single way or pass, and a revoluble and reciprocatory section receiving the splints endwise direct from the separator and forcibly inserting the rows of splints into the holding means.

38. In a match-making machine, the combination with splint-cutting means, of a separator provided with a single way, pass or opening in the plane of the material and diverging into independent rows of independent channels, a carrier having a series of independent sections each receiving the splints in independent rows, a carrier, and means for moving the sections in succession toward the carrier to place the separated splints therein.

39. In a match-making machine, the combination with splint-cutting means, of a separator provided with a single way, pass or opening in the plane of the material and diverging into independent rows of independent channels, an intermittently-movable carrier having a series of independent sections each receiving in succession the independent rows of separated splints, holding means for the splints, and means for moving the sections out of their circle of rotation to forcibly insert the splints into the holding means.

40. In a match-making machine, the combination with means for supplying splints, of a carrier, and a transfer device having holding devices for the splints and a movable abutment-plate adapted to close the inner open ends of the holding devices while sticking the splints, said plate having openings adapted to register with the holding devices while the splints are being received to permit the incoming splints to force any material in the holding devices through the openings in the abutment-plate.

41. In a match-making machine, the combination with means for supplying splints, of a carrier comprising a series of independent sections, means for revolving the sections, a thrust-block engaging the sections, means for operating the thrust-block, and holding means for the splints.

42. In a match-making machine, the combination with means for supplying splints, of a carrier, and a second or transfer carrier comprising a series of independent sections, means for revolving the sections, a thrust or eccentric block engaging the inner side of each section, an eccentric working within the block, and means for operating the eccentric.

43. In a match-making machine, the combination with means for supplying splints, of a carrier, and a second carrier or transfer device comprising a series of independent sections adapted to receive and hold the splints, arms connecting the diametrically opposite sections together, means for rotating the arms, together with means for reciprocating the arms and sections radially to force the splints into the carrier.

44. In a match-making machine, the combination with means for supplying splints, of a carrier, and a second carrier or transfer device comprising a series of independent sections adapted to receive and hold the splints, arms connecting the diametrically opposite sections together, means for rotating the arms, a thrust-block engaging the sections, and means for operating the thrust-block.

45. In a match-making machine, the combination with means for supplying splints, of a carrier, and a second carrier or transfer device comprising a series of independent sections adapted to receive and hold the splints, arms connecting the diametrically opposite sections together, means for rotating the arms, a thrust-block engaging the sections, an eccentric working within the thrust-block, and means for operating the eccentric.

46. In a match-making machine, the combination with means for supplying splints, of a carrier, and a second carrier or transfer device comprising a series of independent sections adapted to receive and hold the splints, arms connecting the diametrically opposite sections together, wheels for moving the arms and sections, a thrust-block engaging each section, and an eccentric working within the thrust-block and operating the block to reciprocate the sections.

47. In a match-making machine, the combination with splint-cutting means, of a separator receiving the splints from the cutting means and dividing them into independent rows, a carrier, and a transfer device receiving the rows from the separator and moving them bodily and forcibly inserting the rows into the carrier.

J. A. EKIN CRISWELL.

Witnesses:
WM. R. DAVIS,
WILLIAM FOSTER.